US010362125B2

(12) United States Patent
Deng et al.

(10) Patent No.: US 10,362,125 B2
(45) Date of Patent: Jul. 23, 2019

(54) TECHNOLOGIES FOR PRE-ACTION EXECUTION

(71) Applicant: INTEL CORPORATION, Santa Clara, CA (US)

(72) Inventors: Pan Deng, Shanghai (CN); Junyong Ding, Shanghai (CN); Shu Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/779,230

(22) PCT Filed: Sep. 18, 2014

(86) PCT No.: PCT/CN2014/086845
§ 371 (c)(1),
(2) Date: Sep. 22, 2015

(87) PCT Pub. No.: WO2016/041175
PCT Pub. Date: Mar. 24, 2016

(65) Prior Publication Data
US 2017/0208143 A1    Jul. 20, 2017

(51) Int. Cl.
*H04L 29/08* (2006.01)
*H04L 12/927* (2013.01)
*H04L 29/06* (2006.01)

(52) U.S. Cl.
CPC ............ *H04L 67/22* (2013.01); *H04L 47/808* (2013.01); *H04L 67/02* (2013.01); *H04L 67/306* (2013.01); *H04L 67/42* (2013.01)

(58) Field of Classification Search
CPC ......... H04L 43/00; H04L 67/00; H04L 67/02; H04L 67/14; H04L 67/147; H04L 67/28;
(Continued)

(56) References Cited

U.S. PATENT DOCUMENTS 6,012,052 A * 1/2000 Altschuler ........ G06F 17/30902
6,085,193 A * 7/2000 Malkin ............. G06F 17/30902
(Continued)

FOREIGN PATENT DOCUMENTS

CN    102609607    7/2012
CN    102891916    1/2013
(Continued)

OTHER PUBLICATIONS

Ali et al.—Intelligent Naïve Bayes-based approaches for Web proxy caching—ScienceDire—2012.*
(Continued)

*Primary Examiner* — Tauqir Hussain
*Assistant Examiner* — Boris D Grijalva Lobos
(74) *Attorney, Agent, or Firm* — Barnes & Thornburg LLP

(57) ABSTRACT

Technologies for pre-action execution include a client computing device to request a resource from a server and receive content from the server including the requested resource and one or more pre-action hints. Each of the one or more pre-action hints identifies a suggested pre-action to be taken by the client computing device prior to receipt of a corresponding user request to perform the corresponding suggested pre-action. The client computing device determines a likelihood of success of one or more pre-actions based on historical behavior data of a user of the client computing device, wherein each pre-action corresponds to at least one of the one or more pre-action hints. The client computing device selects a pre-action to execute based on the determined likelihood of success of the one or more pre-actions.

24 Claims, 7 Drawing Sheets

(58) Field of Classification Search
CPC . H04L 67/22; H04L 67/2842; H04L 67/2847; H04L 67/2857; H04L 67/306; H04L 67/42; H04L 47/808; H04L 43/08; G06F 11/00; G06F 11/30; G06F 11/34; G06F 11/3438; G06F 15/00; G06F 15/16

See application file for complete search history.

(56) References Cited

U.S. PATENT DOCUMENTS

| | | | |
|---|---|---|---|
| 6,633,968 B2* | 10/2003 | Zwiegincew | G06F 12/08 |
| | | | 711/213 |
| 9,430,745 B2* | 8/2016 | Leymann | G06Q 10/06 |
| 9,648,088 B1* | 5/2017 | Pande | H04L 67/10 |
| 9,747,386 B1* | 8/2017 | Jenkins | G06F 17/30902 |
| 9,769,030 B1* | 9/2017 | Ramalingam | H04L 67/22 |
| 2003/0187984 A1 | 10/2003 | Banavar et al. | |
| 2005/0071617 A1* | 3/2005 | Zimmer | G06F 9/4401 |
| | | | 713/1 |
| 2005/0144394 A1* | 6/2005 | Komarla | G06F 12/0862 |
| | | | 711/137 |
| 2006/0294223 A1 | 12/2006 | Glasgow et al. | |
| 2007/0219984 A1* | 9/2007 | Aravamudan | G06F 17/30035 |
| 2008/0183801 A1 | 7/2008 | Martin | |
| 2012/0143681 A1 | 6/2012 | Alcazar et al. | |
| 2014/0171039 A1 | 6/2014 | Bjontegard | |
| 2014/0379840 A1* | 12/2014 | Dao | H04L 67/2847 |
| | | | 709/213 |

FOREIGN PATENT DOCUMENTS

| | | |
|---|---|---|
| CN | 103019518 | 4/2013 |
| CN | 103106208 | 5/2013 |

OTHER PUBLICATIONS

Silberman—The Quest for Meaning—wired.com—Jan 2000.*
Venketesh et al.—Semantic Web Prefetching Scheme Using Naive Bayes Classifier—Technomathematics Research Foundation—2010.*
Prefetcher—Wikipedia, the free encyclopedia—2013.*
Scary or Not_ More Online Ads Are Targeting User Behavior—SmallBizLink—2009.*
What is Collaborative Filtering—Definition from Techopedia—2012.*
International Search Report for International Application PCT/CN2014/086845, dated Jun. 10, 2015, 3 pages.
Written Opinion for International Application PCT/CN2014/086845, dated Jun. 10, 2015, 3 pages.
"Collaborative filtering", downloaded from http"//en.wikipedia.org/wiki/Collaborative_filtering, retrieved Jun. 10, 2014.
"Inverse document frequency", downloaded from http://nlp.stanford.edu/IR-book/html/htmledition/inverse-document-frequency-a.html, retrieved Jul. 31, 2014.
European Search Report dated May 2, 2018 for European Patent Application No. 14902112.3-1213, 7 pages.
First Office action in Chinese patent application No. 201480081263.8 dated May 31, 2019, including machine translation (20 pages).

* cited by examiner

TECHNOLOGIES FOR PRE-ACTION EXECUTION

CROSS REFERENCE TO RELATED APPLICATIONS

This application is a national stage entry under 35 USC § 371(b) of International Application No. PCT/CN2014/086845, which was filed Sep. 18, 2014.

BACKGROUND

Modern web browsers support a variety of features that aim to reduce the end user's navigation latency. Some browsers may prefetch resources, prerender resources, and/or perform other pre-actions prior to the use or access of the corresponding resources by the user. For example, a website may specify that a user is highly likely to require a particular linked resource, and the browser may fetch and/or render that resource before it is accessed (e.g., before it is clicked).

Although the goal of prefetching resources is to improve the user experience, in certain circumstances, the user experience is hampered. That is, if the prefetched or prerendered resource is in fact accessed (e.g., clicked) by the user, network latency is improved from the user's perspective. However, if the prefetched or prerendered resource is not accessed, computer processing time and network bandwidth is wasted by fetching/rendering undesired resources. The task of performing the appropriate pre-actions is further complicated by the reality that users have different preferences and habits and are therefore not equally likely to access particular resources in all circumstances.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
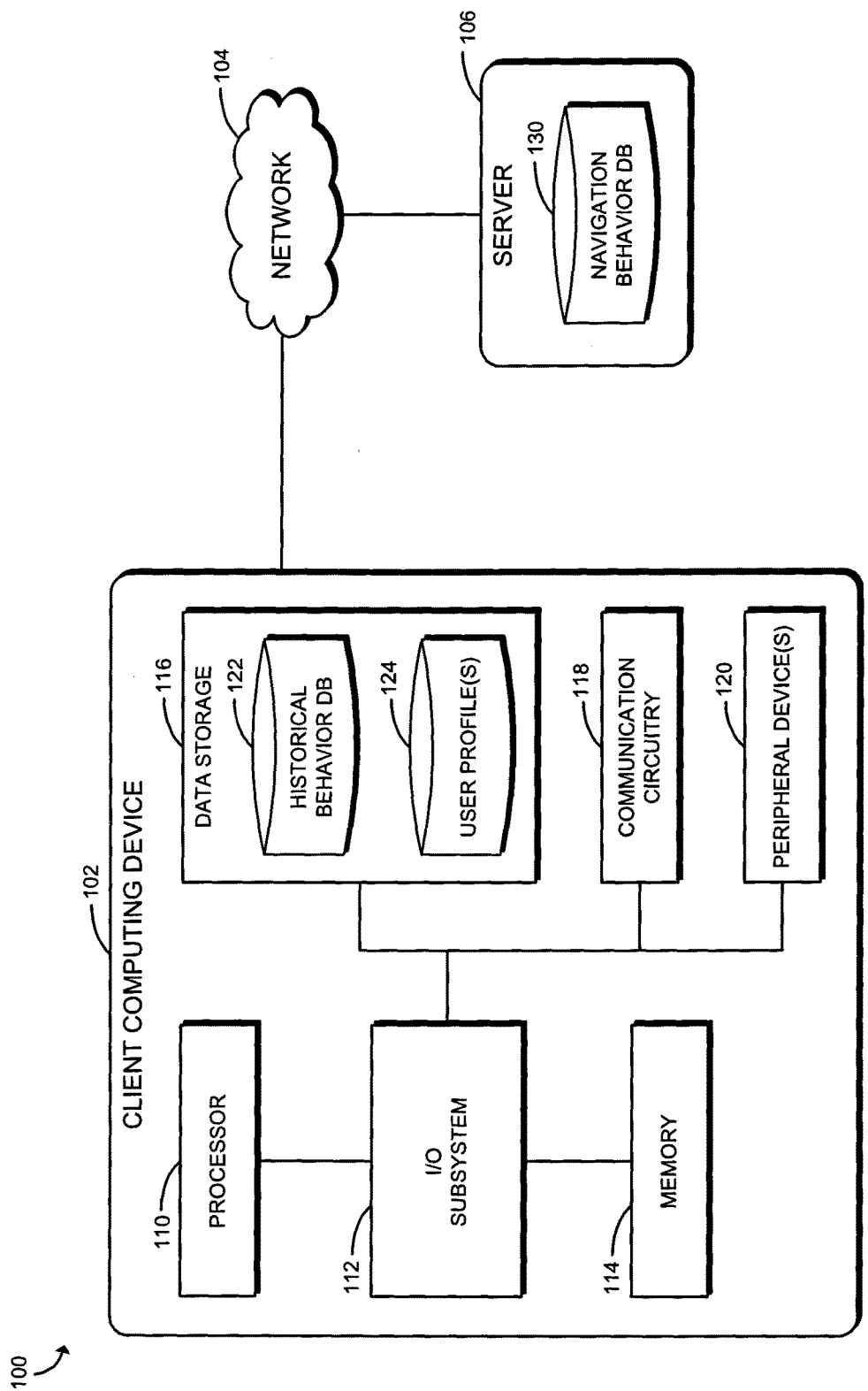
FIG. 1 is a simplified block diagram of at least one embodiment of a system for pre-action execution by a client computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for executing pre-actions by a computing device includes a client computing device 102, a network 104, and a server 106. As described in detail below, in use, the client computing device 102 may request a resource, such as a web page, from the server 106. The server 106 generates content based on the requested resource and includes one or more pre-action hints for the client computing device 102 to consider. In the illustrative embodiment, the pre-action hints are suggested actions to be taken by the client computing device 102 prior to receipt of a corresponding user request to perform the action. For example, the server 106 may suggest the client computing device 102 to prefetch and/or prerender one or more other resources (e.g., web pages linked by the requested resource) based on the requested resource. The client computing device 102 receives the content from the server 106, determines a likelihood of success of the pre-actions corresponding with the pre-action hints, and determines one or more pre-actions to execute based on the determined likelihoods of success. In other words, in the illustrative embodiment, the server 106 marks pre-action hints in content distributed to the client computing device 102, and the client computing device 102 evaluates those pre-action hints (e.g., probabilistically) to, for example, determine which pre-actions to execute to improve pre-action precision.

The client computing device 102 may be embodied as any type of computing device capable of performing the functions described herein. For example, the client computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative client computing device 102 includes a processor 110, an input/output ("I/O") subsystem 112, a memory 114, a data storage 116, a communication circuitry 118, and one or more peripheral devices 120. Of course, the client computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the client computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the client computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the client computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. As shown in FIG. 1, the data storage 116 of the client computing device 102 includes a historical behavior database 122 and one or more user profiles 124. In the illustrative embodiment, the historical behavior database 122 includes information regarding the historical behavior of a particular user(s) of the client computing device 102. For example, as described below, the client computing device 102 updates the historical behavior database 122 based on the success or failure of the pre-actions taken (e.g., based on pre-action hints received from the server 106). In some embodiments, the historical behavior database 122 may include any additional information indicative of the user's behavior such as, for example, shopping lists, browser histories, preferences, habits, and/or other behavioral information. The user profiles 124 may include any information (i.e., user profile data) that identifies an aspect of the specific user(s) of the client computing device 102. As described below, the user profile may be used, for example, to determine the likelihood of success of suggested pre-actions. In some embodiments, the user profiles 124 may include the user's gender, age, hobbies, demographic classes, and/or other information that identifies an aspect or characteristic of the specific user(s). It should be appreciated that the historical behavior database 122 may be embodied as a system-wide historical behavior database and/or the user profiles 124 may be embodied as system-wide user profiles 124 in some embodiments, whereas the historical behavior database 122 and/or the user profiles 124 may be related specifically to the pre-action execution techniques described herein in other embodiments.

Although the historical behavior database 122 and the user profiles 124 are included in the data storage 116 in the illustrative embodiment, the historical behavior database 122 and/or the user profiles 124 may be stored elsewhere on the client computing device 102 in other embodiments. Further, in some embodiments, the historical behavior database 122 and/or the user profiles 124 may be stored remotely and accessible to the client computing device 102. In some embodiments, the historical behavior database 122 and the user profiles 124 are inaccessible to the server 106, for example, to enhance the privacy of the corresponding users. The data storage 116 and/or the memory 114 may store various data useful in the operation of the client computing device 102 as discussed below.

The communication circuitry 118 of the client computing device 102 may be embodied as any communication circuitry, device, or collection thereof, capable of enabling communications between the client computing device 102 and other remote devices (e.g., the server 106). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the client computing device 102.

The network 104 may be embodied as any type of communication network capable of facilitating communication between the client computing device 102 and remote devices (e.g., the server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The server 106 may be embodied as any type of computing device capable of performing the functions described herein. For example, in some embodiments, the server 106 is embodied as a web server or collection of web servers configured to deliver web content to the client computing device 102. In some embodiments, the server 106 may be similar to the client computing device 102 as described above. For example, the server 106 may be embodied as a desktop computer, server, laptop computer, notebook, netbook, Ultrabook™, personal digital assistant, mobile Internet device, wearable computing device, Hybrid device, and/or any other computing/communication device. Further, the server 106 may include components similar to those of the client computing device 102 discussed above. The description of those components of the client computing device 102 is equally applicable to the description of components of the server 106 and is not repeated herein for clarity of the description.

Additionally, in the illustrative embodiment, a navigation behavior database 130 is stored on, or otherwise accessible to, the server 106. In some embodiments, the navigation behavior database 130 includes historical information regarding navigation interactions of computing devices (e.g., the client computing device 102) with the server 106. For example, in the illustrative embodiment, the navigation behavior database 130 includes session-based resource access records. It should be appreciated that the resource records are session-based in such embodiments rather than user-based to maintain the privacy of the users. As described below, the server 106 may update the navigation behavior database 130 based on resource requests (e.g., user-initiating requests) from computing devices (e.g., the client computing device 102). Further, it should be appreciated that the server 106 may include other components, sub-components, and devices commonly found in a computing device, which are not discussed above in reference to the client computing device 102 and not discussed herein for clarity of the description. Additionally, in some embodiments, one or more of the components of the client computing device 102 may be omitted from the server 106 (e.g., the peripheral devices 120). Although only one client computing device 102, one network 104, and one server 106 are shown in the illustrative embodiment of FIG. 1, the system 100 may include multiple client computing devices 102, networks 104, and/or servers 106 in other embodiments. For example, the client computing device 102 may communicate with multiple web servers 106 over multiple networks 104 to access content, pre-action hints, and/or other information related to access of a particular resource.

Figure 2:
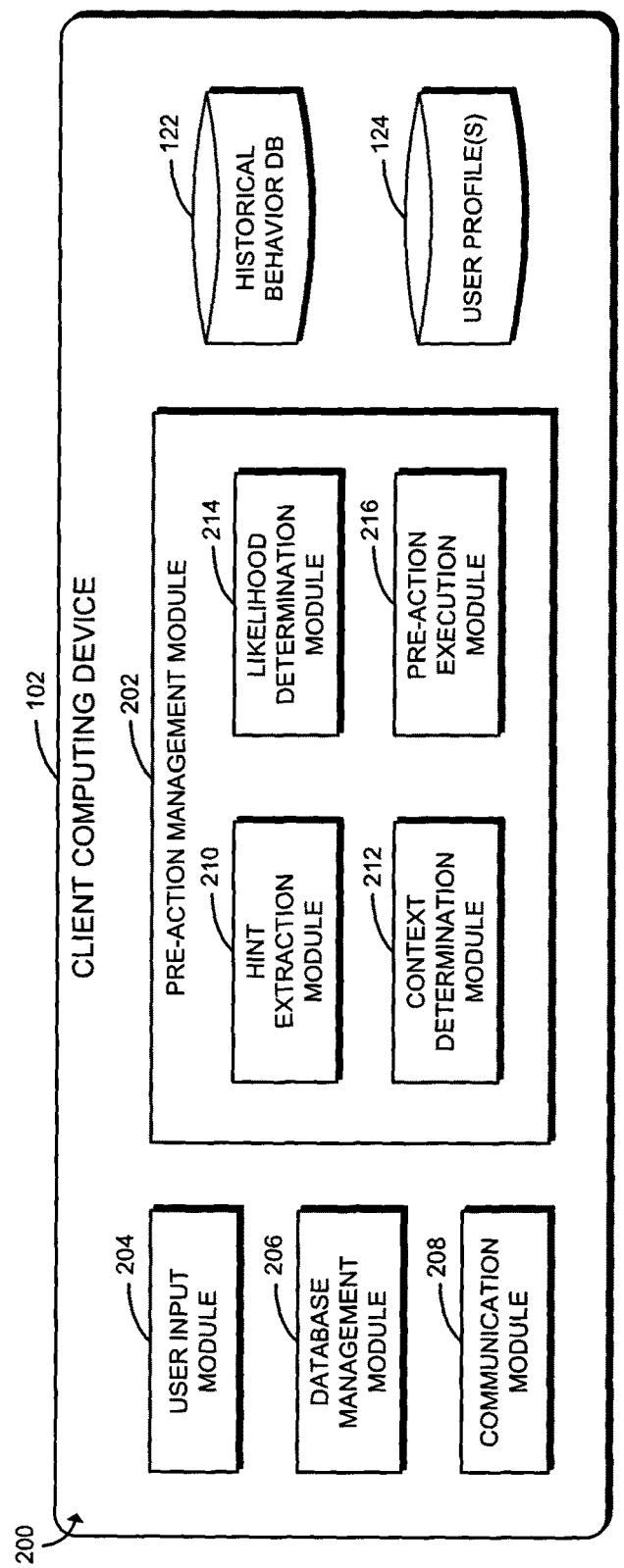
FIG. 2 is a simplified block diagram of at least one embodiment of an environment of the client computing device of the system of FIG. 1.

Referring now to FIG. 2, in use, the client computing device 102 establishes an environment 200 for pre-action execution. The illustrative environment 200 of the client computing device 102 includes a pre-action management module 202, a user input module 204, a database management module 206, and a communication module 208. Additionally, in the illustrative embodiment, the pre-action management module 202 includes a hint extraction module 210, a context determination module 212, a likelihood determination module 214, and a pre-action execution module 216. Each of the modules of the environment 200 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 200 may form a portion of, or otherwise be established by, the processor 110 of the client computing device 102.

The pre-action management module 202 is configured to determine which pre-actions (e.g., prefetch, prerender, etc.) to execute, if any, based on pre-action hints received from the server 106. As indicated above, the illustrative pre-action management module 202 includes the hint extraction module 210, the context determination module 212, the likelihood determination module 214, and the pre-action execution module 216.

As described herein, the server 106 provides content to the client computing device 102 including various pre-action hints, which the client computing device 102 may act on or ignore, depending on the particular embodiment. The hint extraction module 210 is configured to extract the pre-action hints from the content received from the client computing device 102 (e.g., via the communication module 208) using any suitable technique and/or mechanism. In some embodiments, one or more of the pre-action hints provided by the server 106 may not be interpretable by the hint extraction module 210 in which case the hint extraction module 210 may, for example, ignore the uninterpretable pre-action hint(s) or generate an alert message indicating the pre-action hint(s) have not been processed. In some embodiments, the hint extraction module 210 of the client computing device 102 only extracts the pre-action hints if they are interpretable by the client computing device 102.

The context determination module 212 is configured to determine the context of the client computing device 102. Additionally, in some embodiments, the context determination module 212 may extract or otherwise determine/analyze contextual information from the content received from the server 106 (e.g., with the pre-action hints). For example, the context determination module 212 may determine the availability of various resources of the client computing device 102 (e.g., memory, processing capacity, bandwidth, etc.), the cost of executing various pre-actions (e.g., the computational cost, bandwidth usage, etc.), and/or other information related to the selection and/or execution of pre-actions by the client computing device 102. As indicated below, the client computing device 102 may utilize the contextual information or analysis of the context determination module 212 to determine the number of pre-actions (e.g., associated with the pre-action hints) to execute. In some embodiments, contextual information is transmitted from the server 106 to the client computing device 102 for analysis.

The likelihood determination module 214 determines a likelihood of success of the pre-actions corresponding with the pre-action hints received from the server 106. In other words, the likelihood determination module 214 determines the likelihood (e.g., the probability) that the user of the client computing device 102 requests a particular action to be taken that corresponds with the pre-action. For example, the client computing device 102 may request a particular web page (e.g., ABC web page) from the server 106. As indicated above, the server 106 may transmit the requested ABC web page to the client computing device 102 and include one or more pre-action hints related to access of various sub-resources of the ABC web page (e.g., links to a DEF web page, a GHI web page, and a JKL web page). The pre-action hints may include, for example, suggestions to prefetch the DEF web page, the GHI web page, and/or the JKL web page. In other words, in the illustrative embodiment, the pre-action hints are suggested pre-actions to be taken by the client computing device 102 prior to a user of the client computing device 102 actually requesting that action to be taken. In determining the likelihood of success of prefetching, for example, the DEF web page, the likelihood determination module 214 may determine the probability that the user of the client computing device 102 requests the DEF web page. In the illustrative embodiment, the likelihood determination module 214 determines the likelihoods of success of the pre-actions based on the historical behavior database 122 and/or the user profiles 124. It should be appreciated that the likelihood determination module 214 may utilize any suitable techniques, algorithms, and/or mechanisms for doing so.

The pre-action execution module 216 determines one or more pre-actions to execute and executes those determined pre-actions. In the illustrative embodiment, the pre-action execution module 216 determines which pre-actions to execute based on the determined likelihood of success of those pre-actions as determined by the likelihood determination module 214. For example, the pre-action execution module 216 may execute one, two, three, or another number of pre-actions that are most likely to be successful. In some embodiments, the pre-action execution module 216 may sort the pre-actions based on likelihood of success and/or consider the capabilities of the client computing device 102 or other contextual information in determining the pre-actions to execute. Of course, in other embodiments, the pre-action execution module 216 may utilize any suitable algorithms, techniques, and/or mechanisms to determine which pre-actions to execute. As indicated above, the pre-actions may include, for example, prefetching or prerendering a particular resource (e.g., a web page).

The user input module 204 is configured to process user inputs of the client computing device 102. In the illustrative embodiment, the user input module 204 may determine whether a resource request has been user-initiated or automatically requested (e.g., without user involvement). Further, the user input module 204 may tag a resource request and/or otherwise provide an indication that a particular resource request was user-initiated, which may be utilized by the client computing device 102 and/or the server 106 as described herein. For example, in some embodiments, the user input module 204 may "hook" a user's mouse/touch event when a web page is requested and include an indication that the web page was user-initiated with the requested uniform resource identifier (URI) transmitted to the server 106. Alternatively or additionally, the user input module 204 may provide such indication using an Extensible Markup Language Hyper Text Transfer Protocol Request (XMLHttpRequest or XHR) or beacon. Of course, the user input module 204 may otherwise indicate that a resource is user-requested in other embodiments.

The database management module 206 maintains the historical behavior database 122 and/or the user profiles 124 of the client computing device 102. For example, in the illustrative embodiment, the database management module 206 updates the historical behavior database 122 based on the success or failure of executed pre-actions.

The communication module 208 handles the communication between the client computing device 102 and remote computing devices (e.g., the server 106) through the network 104. For example, as described herein, the communication module 208 may communicate with the server 106 to request a particular resource (e.g., a web page for which a link was clicked by a user of the client computing device 102) and receive the corresponding content (e.g., the web page and any generated pre-action hints).

Figure 3:
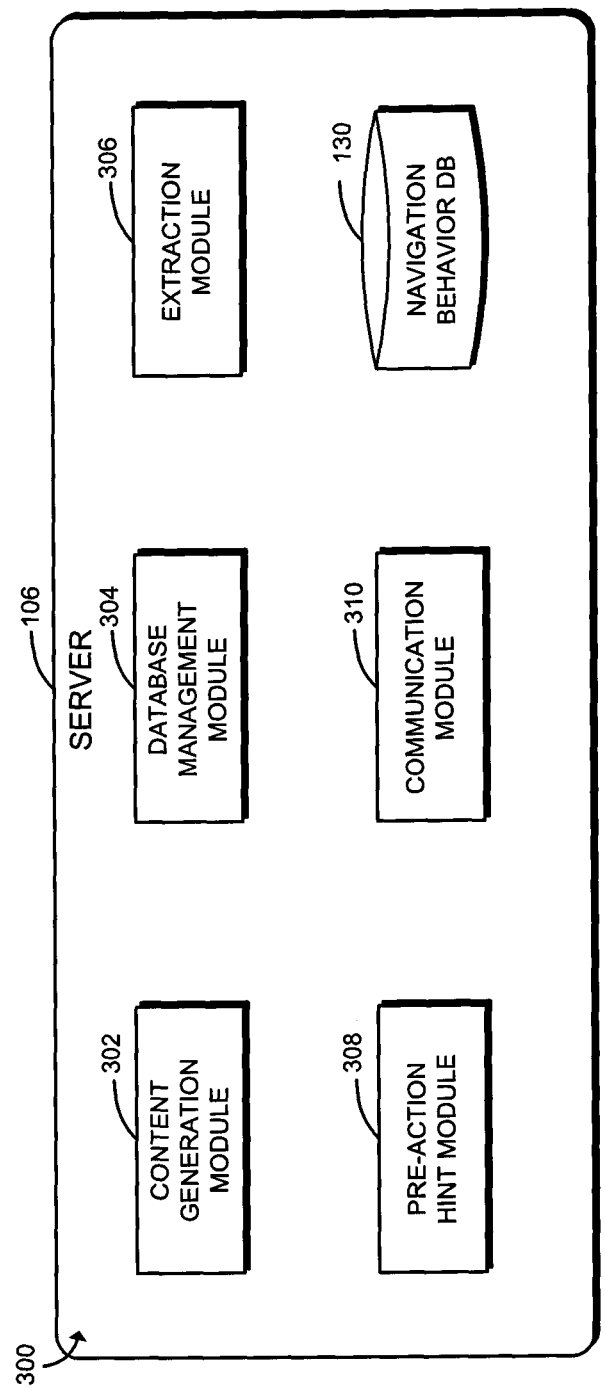
FIG. 3 is a simplified block diagram of at least one embodiment of an environment of the server of the system of FIG. 1.

Referring now to FIG. 3, in use, the server 106 establishes an environment 300 for pre-action hint generation. The illustrative environment 300 of the server 106 includes a content generation module 302, a database management module 304, an extraction module 306, a pre-action hint module 308, and a communication module 310. Each of the modules of the environment 300 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 300 may form a portion of, or otherwise be established by, a processor of the server 106.

The content generation module 302 generates content based on resource requests received from the client computing device 102 (e.g., via the communication module 310). In the illustrative embodiment, the content generation module 302 generates content that includes the resource requested by the client computing device 102 (e.g., a web page) and one or more pre-action hints for transmittal to the client computing device 102. As indicated above, the client computing device 102 considers the pre-action hints and determines whether to execute any of the corresponding pre-actions. For example, in some embodiments, the content generation module 302 may identify the requested resource(s) and utilize JavaServer Pages (JSP) or Hypertext Preprocessor (PHP) to generate or fill a HyperText Markup Language (HTML) document with data from one or more databases of the server 106. If pre-action hints are identified, the content generation module 302 may update the generated content (e.g., the HTML file) to include the pre-action hints (e.g., as parameters or "backend" data). For example, depending on the particular embodiment, the content generation module 302 may update the content itself to include the pre-action hints, incorporate the pre-action hints in a header of the generated content, prepare the pre-action hints for transmission to the client computing device 102 separate from (e.g., contemporaneously with) the generated content, or otherwise convey the pre-action hints to the client computing device 102.

The database management module 304 maintains the navigation behavior database 130 of the server 106. For example, in the illustrative embodiment, the database management module 304 determines whether a request for a particular resource received from the client computing device 102 was initiated by a user of the client computing device 102 (i.e., determines whether the request was user-initiated) and, if so, updates the navigation behavior database 130 based on the requested resource (e.g., a web page). For example, the database management module 304 may associate the requested resource with a session identifier of a current session between the server 106 and the client computing device 102. As discussed above, the client computing device 102 may inform the server 106 that the resource is user-requested in a variety of ways depending on the particular embodiment.

The extraction module 306 extracts one or more sub-resources from the requested resource or the corresponding generated content. For example, in some embodiments, the client computing device 102 may resource a particular web page. In such embodiments, the server 106 constructs the requested web page for transmittal to the client computing device 102. The requested/constructed web page may include, for example, hyperlinks to other web pages and/or other sub-resources, which are extracted by the extraction module 306 for pre-action hint generated as discussed herein. It should be appreciated that, in some embodiments, the server 106 may determine not to generate pre-action hints for a particular resource request. For example, the extraction module 306 may determine not to extract sub-resources from the requested resource or generated content if the navigation behavior database 130 is empty, the requested resource includes no sub-resources, and/or for other suitable reasons depending on the particular embodiment.

The pre-action hint module 308 determines which, if any, pre-action hints to provide to the client computing device 102 with the requested resource based on the extracted sub-resources. As indicated above, the pre-action hints are suggested actions to be taken by the client computing device 102 that may, for example, reduce the latency associated with accessing or rendering requested resources and thereby improve the user experience. In particular, the pre-action hints are suggested actions to be taken by the client computing device 102 prior to a user of the client computing device 102 actually requesting that action to be taken. For example, the pre-action hint module 308 may generate a pre-action hint indicating that the client computing device 102 should prefetch a particular resource (e.g., a web page). As discussed above, the client computing device 102 analyzes the pre-action hints to determine which corresponding pre-actions, if any, to execute. It should be appreciated that the pre-action hint module 308 may utilize any suitable algorithm, technique, and/or mechanism for generating the pre-action hints. For example, in the illustrative embodiment, the pre-action hint module 308 utilizes a collaborative filtering algorithm to determine previous sessions between the server 106 and a computing device (e.g., the client computing device 102 or another computing device) that are most similar to the current session between the server 106 and the client computing device 102 and determines pre-action hints based on resources requested in the previous similar sessions. Of course, as indicated above, the pre-action hint module 308 may utilize other suitable filtering algorithms in other embodiments.

The communication module 310 handles the communication between the server 106 and remote computing devices (e.g., the client computing device 102) through the network 104. For example, as described herein, the communication module 310 may receive a request for a particular resource (e.g., a web page) from the client computing device 102 and respond to the client computing device 102 with the corresponding generated content and pre-action hints.

Figure 4:
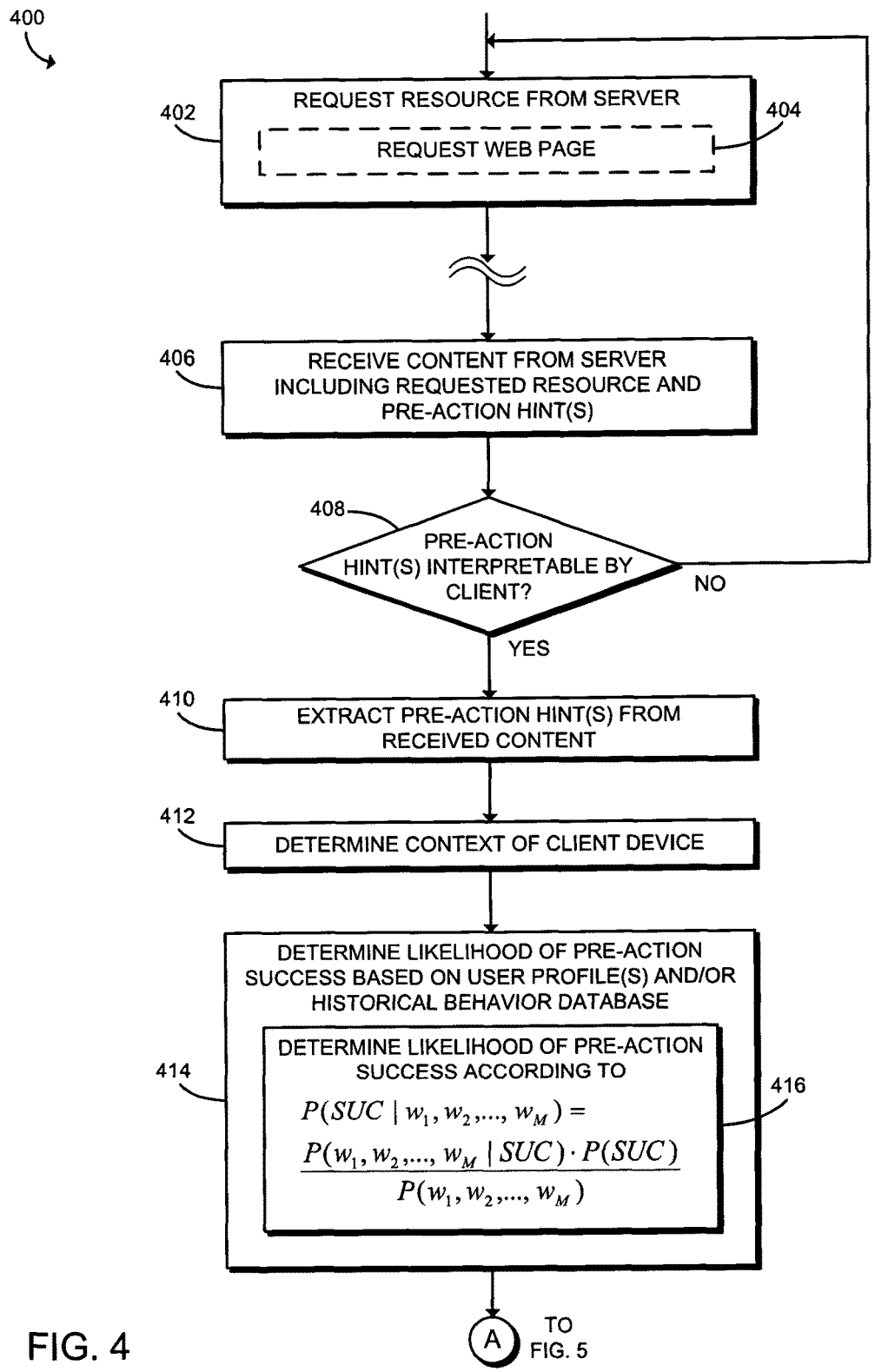
FIGS. 4-5 is a simplified flow diagram of at least one embodiment of a method of pre-action execution by the client computing device of the system of FIG. 1.
Figure 5:
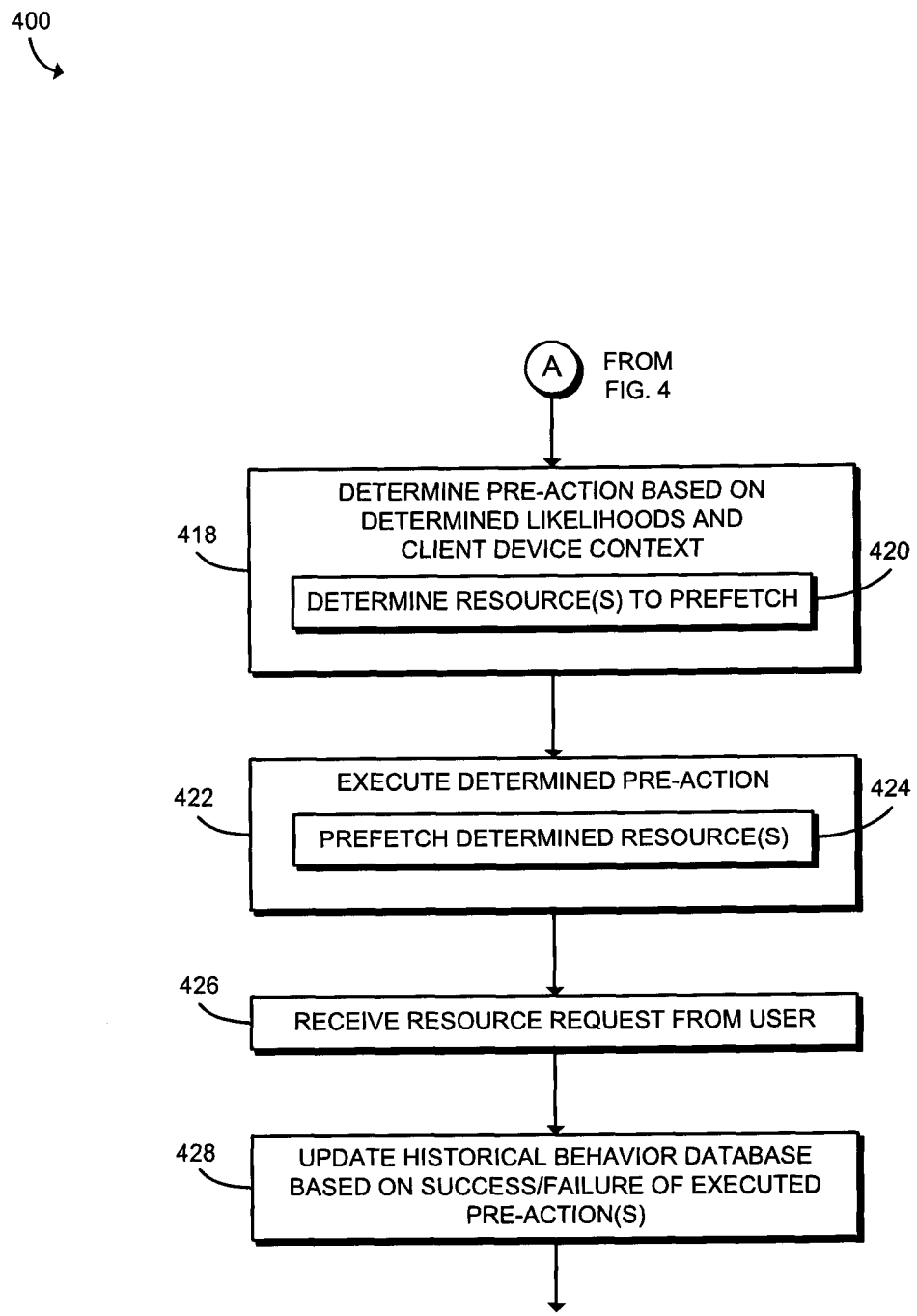

Referring now to FIGS. 4-5, in use, the client computing device 102 may execute a method 400 for pre-action execution. The illustrative method 400 begins with block 402 of FIG. 4 in which the client computing device 102 requests a resource from the server 106. For example, the client computing device 102 may request a web page from the server 106 in block 404. In such embodiments, the client computing device 102 may request the web page in response to a user clicking a hyperlink. As indicated above, the server 106 determines one or more pre-action hints for the client computing device 102 based on the requested request. An illustrative embodiment of a method 600 of such pre-action hint generation is described below in reference to FIGS. 6-7.

In block 406, the client computing device 102 receives content from the server 106 including the requested resource (e.g., a web page) and one or more pre-action hints. In block 408, the client computing device 102 determines whether it can interpret the received pre-action hints. In some embodiments, the client computing device 102 may be able to interpret some pre-action hints (e.g., in some formats but not in other formats), so the client computing device 102 may determine whether the pre-action hints are in the interpretable format. In other embodiments, pre-action hints that are not interpretable by the client computing device 102 may not even be recognized (e.g., as existing) by the client computing device 102. If no pre-action hints are interpretable by the client computing device 102, the client computing device 102 may render or otherwise process the received content without regard to the pre-action hints (e.g., as the client computing device 102 would normally process the content). The method 400 returns to block 402 in which the client computing device 102 requests another resource of the server 106 (e.g., in response to the user clicking a link on a web page). However, if there is at least one pre-action hint that is interpretable by the client computing device 102, the client computing device 102 extracts the interpretable pre-action hints from the received content in block 410. It should be appreciated that, in some embodiments, the client computing device 102 may determine whether a particular pre-action hint is interpretable by the client computing device 102 after extracting it from the received content.

In block 412, the client computing device 102 determines the context of the client computing device 102 and/or retrieves other contextual information. The determined context may be embodied as any data that identifies a characteristic or aspect (e.g., a hardware or operational characteristic or aspect) of the computing device. For example, as discussed above, the client computing device 102 may determine the availability of various resources of the client computing device 102 (e.g., memory, processing capacity, bandwidth, etc.), the cost of executing various pre-actions (e.g., the computational cost, bandwidth usage, etc.), and/or other contextual information related to the selection and/or execution of pre-actions by the client computing device 102. Further, in some embodiments, the server 106 transmits contextual information in which case the client computing device 102 may extract that contextual information from the received content.

In block 414, the client computing device 102 determines the likelihood of success of the pre-actions based on the historical behavior database 122 and/or the user profiles 124. In other words, the client computing device 102 determines the likelihood (e.g., the probability) that the user of the client computing device 102 requests a particular action to be taken that corresponds with the pre-action as described above. That is, in some embodiments, a successful pre-action is a pre-action that resulted in an action that is subsequently requested by the user to be performed. For example, in determining the likelihood of success of a pre-action to prefetch XYZ web page, the client computing device 102 may determine the likelihood that the user is going to request the XYZ web page. It should be appreciated that by performing the successful pre-action, for example, latency of the system 100 may be improved. In particular, in block 416, the client computing device 102 may determine the likelihood of success of a particular pre-action according to $$P(SUC\,|\,w_1, w_2, \ldots, w_M) = \frac{P(w_1, w_2, \ldots, w_M\,|\,SUC) \cdot P(SUC)}{P(w_1, w_2, \ldots, w_M)},$$

where SUC is a success of the pre-action and $w_1, w_2, \ldots, w_M$ are a number, M, of keywords from the historical behavior database 122 in close proximity to one another. In other words, the client computing device 102 may determine the probability of a successful pre-action given the particular set of keywords. For example, in some embodiments, the historical behavior database 122 may include a list of vectors (or similar data structures) that each records a success or failure and a set of keywords, $w_1, w_2, \ldots, w_N$. In the context of web pages and hyperlinks, the keywords may include the links in the web page, the anchor text, and/or text around the link. The particular number, N, of keywords utilized may vary depending on the particular implementation. It should be appreciated that a larger number of keywords may improve the accuracy of prediction but may do so at the cost of system resources. If more than the determined number, N, of keywords are extracted, the client computing device 102 may utilize only N of those keywords in some embodiments. For example, the client computing device 102 may select the keywords having the highest inverse document frequency to ensure, for example, that the most important keywords are utilized. As such, M is less than or equal to N as used in this paragraph. In the conditional probability provided above, P(SUC) is the probability of success (e.g., a hit) based on past experience of the user and/or the client computing device 102 as indicated by the historical behavior database 122, $P(w_1, w_2, \ldots, w_M)$ is the probability those keywords appear together in the historical behavior database 122, and $P(w_1, w_2, \ldots, w_M|SUC)$ is the probability that those keywords appear together given that a pre-action was successful. In some embodiments, the client computing device 102 may utilize the user's search history, favorite links, address, key contacts, and/or other information in determining the pre-action success likelihood.

In block 418 of FIG. 5, the client computing device 102 determines one or more pre-actions based on the determined likelihoods of success of the pre-actions and/or the contextual information. For example, in block 420, the client computing device 102 may determine one or more resources (e.g., web pages) to prefetch. In some embodiments, the client computing device 102 sorts the pre-actions according to the determined likelihood of success of the pre-actions and/or otherwise selects a subset of the pre-actions having the greatest likelihood of success (e.g., those pre-actions determined to have a likelihood of success greater than a threshold value). As indicated above, the client computing device 102 may also consider additional factors (e.g., contextual information) in determining which pre-actions to execute. For example, the client computing device 102 may consider the cost of the pre-action, the current context of the client computing device 102, available resources (e.g., memory, computational capacity, bandwidth, etc.), and/or other information.

In block 422, the client computing device 102 executes the selected/determined pre-actions. As indicated above, in some embodiments, the pre-action includes prefetching a resource. Accordingly, in block 424, the client computing device 102 may prefetch the determined resources in some embodiments. In block 426, the client computing device 102 receives another resource request from the user. For example, the user may click a hyperlink on a web page. In block 428, the client computing device 102 updates the historical behavior database 122 based on the success or failure of the executed pre-actions. That is, based on the resource request, the client computing device 102 can determine whether the pre-action was successful and store corresponding data in the historical behavior database 122 to indicate which pre-actions were successful and which were unsuccessful. For example, if the pre-action was to prefetch a particular web page and the user clicked a link to retrieve that web page, the pre-action was successful. However, if the user clicked a different link, that particular pre-action was unsuccessful.

Figure 6:
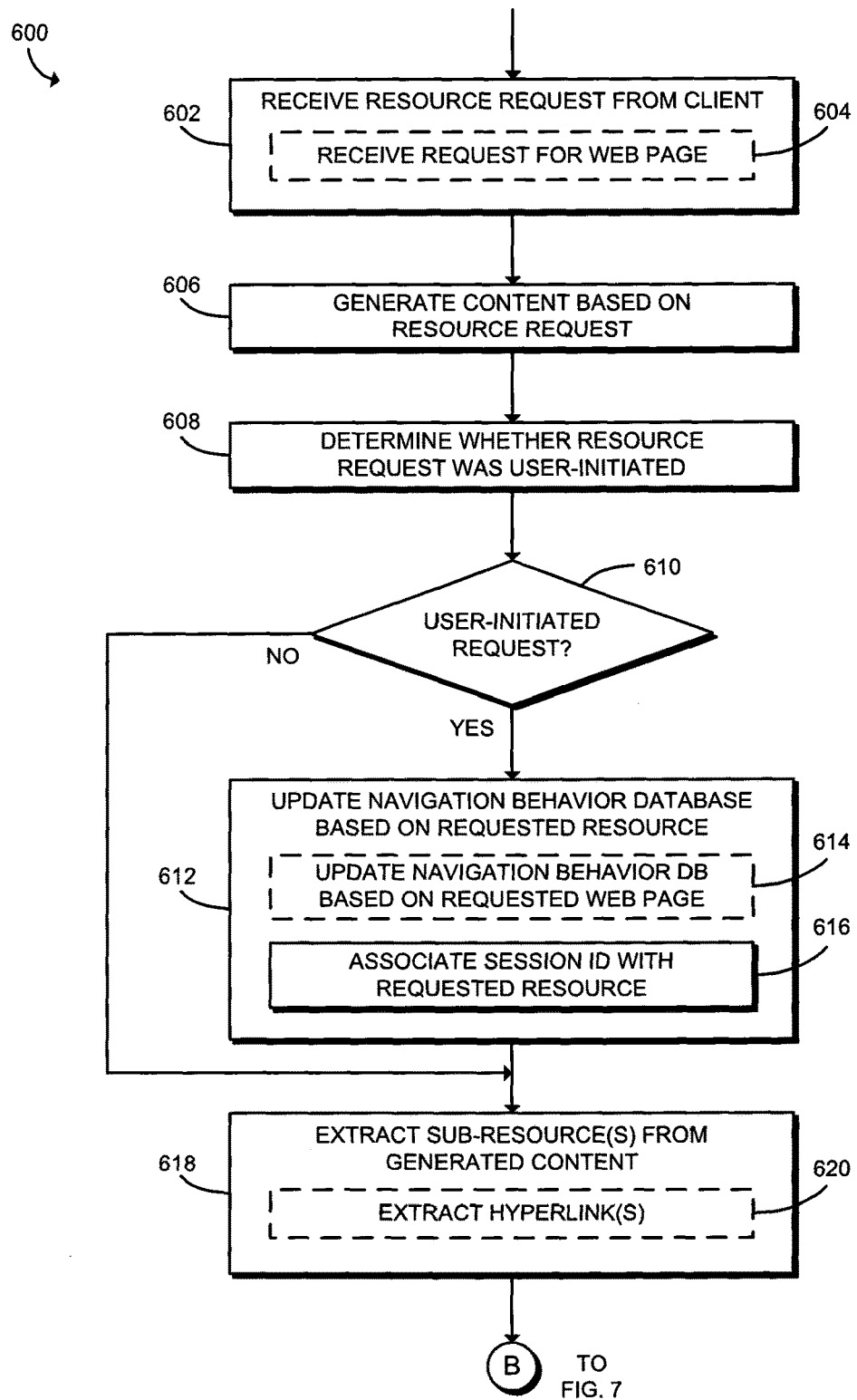
FIGS. 6-7 is a simplified flow diagram of at least one embodiment of a method of pre-action hint generation by the server of the system of FIG. 1.
Figure 7:
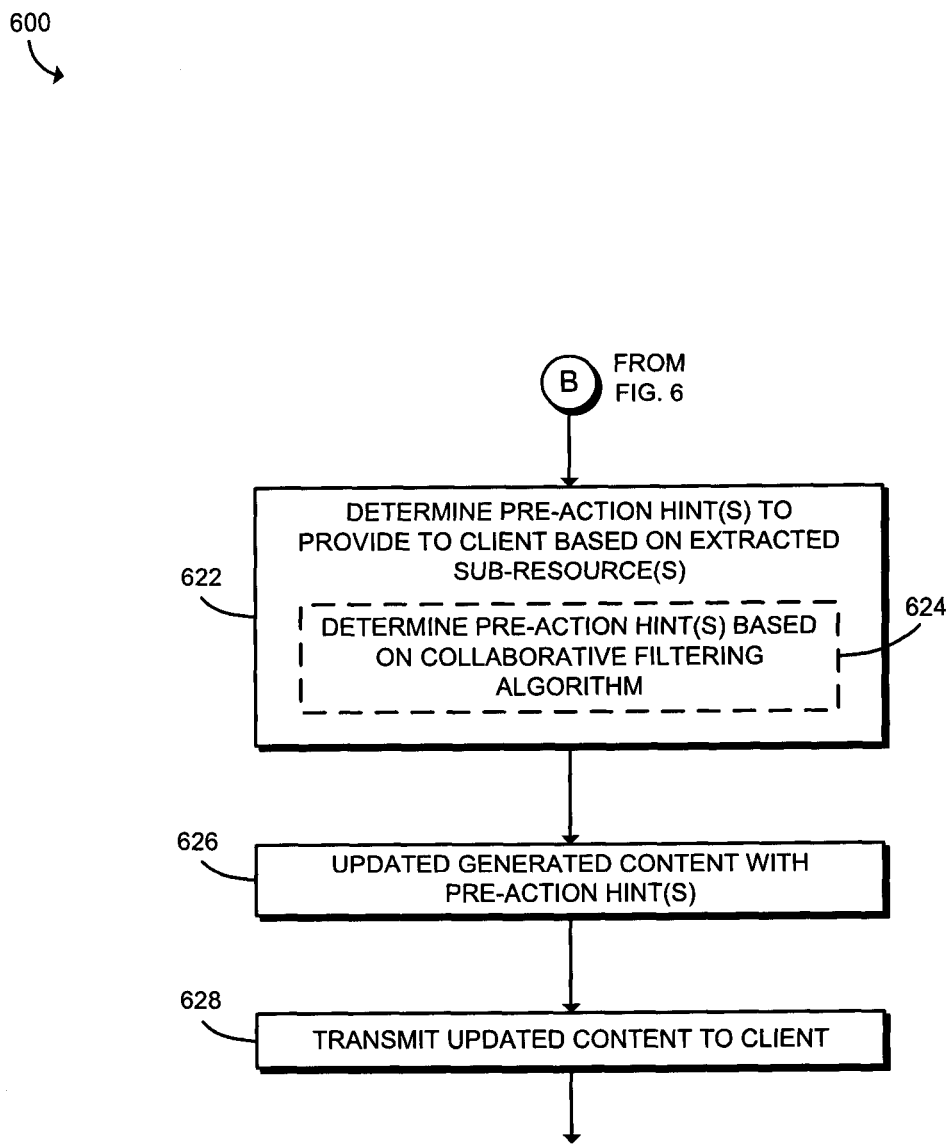

Referring now to FIGS. 6-7, in use, the server 106 may execute a method 600 for pre-action hint generation. The illustrative method 600 begins with block 602 in which the server 106 receives a resource request from the client computing device 102. For example, in some embodiments, the server 106 may request a request for a web page in block 604 as discussed above. In block 606, the server 106 generates content based on the resource request. For example, if the requested resource is a web page, the server 106 may generate an HTML document including the appropriate data.

In block 608, the server 106 determines whether the resource request was user-initiated. As indicated above, in some embodiments, the client computing device 102 utilizes XHR or a beacon to provide such an indication to the server 106. However, it should be appreciated that the client computing device 102 may notify the server 106 that the resource request was user-initiated using any suitable techniques, algorithms, and/or mechanisms. If the server 106 determines, in block 610, that the resource request was user-initiated, the server 106 updates the navigation behavior database 130 based on the requested resource in block 612. As discussed herein, in some embodiments, the requested resource is a web page. Accordingly, in such embodiments, the server 106 may update the navigation behavior database 130 based on the requested web page in block 614. In block 616, the server 106 associates the session identifier of the current session between the server 106 and the client computing device 102 with the requested resource. In some embodiments, a more specific session identifier is stored instead of the actual session identifier, because the actual session identifiers used to identify sessions of the server 106 are oftentimes recycled/reused. For example, the more specific session identifier may be generated based on a timestamp and the actual session identifier (e.g., via concatenation). The server 106 may store the specific session identifier and map the resources requested during that session to the specific session identifier in the navigation behavior database 130. In the illustrative embodiment, the navigation behavior database 130 does not maintain any user-specific information to protect the privacy of the users.

In block 618, the server 106 extracts the sub-resources from the requested resource or the generated content. In particular, in block 620, the server 106 may extract hyperlinks from a webpage. For example, the server 106 may extract all of the links to other resources that require additional processing to access/view (e.g., other web pages, externally linked images, etc.). In block 624 of FIG. 7, the server 106 determines which pre-action hints to provide to the client computing device 102 based on the extracted sub-resources (e.g., the extracted hyperlinks of a webpage). It should be appreciated that the server 106 may utilize any suitable technique, algorithm, and/or mechanism for determining which pre-action hints to provide to the client computing device 102.

For example, in block 624, the server 106 may determine the pre-action hints based on a collaborative filtering algorithm. It should be appreciated that a collaborative filtering algorithm may be utilized to determine previous sessions of the server 106 (stored in the navigation behavior database 130) are most similar to the current session between the server 106 and the client computing device 102 and to determine which pre-action hints to provide based on the resources requested in those previous similar sessions. For example, in some embodiments, the server 106 may generate a set of sub-resources (e.g., a set of links) based on the extracted sub-resources. Each of the sub-resources may be a valid pre-action target (i.e., a valid sub-resource to prefetch, prerender, or otherwise prematurely act on). In some embodiments, the data stored in the navigation behavior database 130 may be represented as a matrix having rows defined by the sessions, $s_i$, of the server 106 and columns defined by the resources, $r_j$, accessed with each entry of the matrix being one or zero depending on whether that particular session accessed the corresponding resource. For example, if the $j^{th}$ resource was accessed in the $i^{th}$ session, the $ij^{th}$ entry of the matrix would be represented as a one. Otherwise, it would be a zero. Those values may be denoted by the function $h_{i,j}$. The server 106 may determine the probability the various resources are going to be requested in the user's next action according to $$P(s, i) = \frac{\sum_{s' \in S} simil(s, s') h_{s',i}}{\sum_{s' \in S} |simil(s, s')|} \text{ where } simil(s, s') = \frac{\sum_{i \in I_{ss'}} h_{s,i} h_{s',i}}{\sqrt{\sum_{i \in I_s} h_{s,i}^2} \sqrt{\sum_{i \in I_{s'}} h_{s',i}^2}},$$

s is the current session, s' are the previous sessions, and i is a particular resource. As indicated above, the server 106 may select a set of N sessions that are most similar to the current session and determine corresponding pre-action hints related to the resources of those sessions. The number of sessions and/or resources selected for pre-action hint generation may vary depending on the particular embodiment.

In block 626, the server 106 updates the generated content (e.g., an HTML document) with the determined pre-action hints. In block 628, the server 106 transmits the updated content to the client computing device 102. As described above, the server 106 may embed the pre-action hints into the generated content in a suitable way and/or otherwise transmit the pre-action hints to the client computing device 102 for consideration. For example, in some embodiments, the server 106 may transmit the pre-action hints to the client computing device 102 approximately contemporaneously with, but separate from, the transmission of the requested content.

EXAMPLES

Illustrative examples of the technologies disclosed herein are provided below. An embodiment of the technologies may include any one or more, and any combination of, the examples described below.

Example 1 includes a client computing device for pre-action execution, the computing device comprising a communication module to (i) request a resource from a server and (ii) receive content from the server including the requested resource and one or more pre-action hints, wherein each of the one or more pre-action hints identifies a suggested pre-action to be taken by the client computing device prior to receipt of a corresponding user request to perform the corresponding suggested pre-action; and a pre-action management module to (i) determine a likelihood of success of one or more pre-actions based on historical behavior data of a user of the client computing device, wherein each pre-action corresponds to at least one of the one or more pre-action hints, and (ii) select a pre-action to execute based on the determined likelihood of success of the one or more pre-actions.

Example 2 includes the subject matter of Example 1, and wherein to request the resource comprises to request a web page from the server.

Example 3 includes the subject matter of any of Examples 1 and 2, and wherein the pre-action management module is further to determine whether the one or more pre-action hints are interpretable by the client computing device.

Example 4 includes the subject matter of any of Examples 1-3, and wherein the pre-action management module is further to extract the one or more pre-action hints from the received content in response to a determination that the one or more pre-action hints are interpretable by the client computing device.

Example 5 includes the subject matter of any of Examples 1-4, and wherein the pre-action management module is further to determine a context of the client computing device; and wherein to select the pre-action to execute comprises to select the pre-action to execute based on the determined likelihood of success of the one or more pre-actions and the determined context of the client computing device.

Example 6 includes the subject matter of any of Examples 1-5, and wherein to determine the likelihood of success comprises to determine a likelihood that the user of the client computing device requests an action associated with the corresponding pre-action to be executed.

Example 7 includes the subject matter of any of Examples 1-6, and wherein to determine the likelihood of success of the one or more pre-actions comprises to determine the likelihood of success of the one or more pre-actions according to:

$$P(SUC | w_1, w_2, \ldots, w_M) = \frac{P(w_1, w_2, \ldots, w_M | SUC) \cdot P(SUC)}{P(w_1, w_2, \ldots, w_M)},$$

wherein SUC is a success of the corresponding pre-action and $w_1, w_2, \ldots, w_M$ are a number, M, of keywords from the historical behavior database in close proximity to one another.

Example 8 includes the subject matter of any of Examples 1-7, and wherein to determine the likelihood of success of the one or more pre-actions comprises to determine the likelihood of success of the one or more pre-actions based on the historical behavior data and a user profile of the user.

Example 9 includes the subject matter of any of Examples 1-8, and wherein to select the pre-action to execute comprises to determine a resource to prefetch.

Example 10 includes the subject matter of any of Examples 1-9, and wherein the pre-action management module is further to execute the suggested pre-action identified by the selected pre-action.

Example 11 includes the subject matter of any of Examples 1-10, and further including a user input module to receive a resource request from the user in response to execution of the determined pre-action; and a database management module to update the historical behavior database based on a success or failure of the executed pre-action, wherein the pre-action is determined to be successful if the received resource request corresponds with the executed pre-action.

Example 12 includes a method of pre-action execution by a client computing device, the method comprising requesting, by the client computing device, a resource from a server; receiving, by the client computing device, content from the server including the requested resource and one or more pre-action hints, wherein each of the one or more pre-action hints identifies a suggested pre-action to be taken by the client computing device prior to receipt of a corresponding user request to perform the corresponding suggested pre-action; determining, by the client computing device, a likelihood of success of one or more pre-actions based on historical behavior data of a user of the client computing device, wherein each pre-action corresponds to at least one of the one or more pre-action hints; and selecting, by the client computing device, a pre-action to execute based on the determined likelihood of success of the one or more pre-actions.

Example 13 includes the subject matter of Example 12, and wherein requesting the resource comprises requesting a web page from the server.

Example 14 includes the subject matter of any of Examples 12 and 13, and further including determining, by the client computing device, whether the one or more pre-action hints are interpretable by the client computing device.

Example 15 includes the subject matter of any of Examples 12-14, and further including extracting, by the client computing device, the one or more pre-action hints from the received content in response to determining the one or more pre-action hints are interpretable by the client computing device.

Example 16 includes the subject matter of any of Examples 12-15, and further including determining, by the client computing device, a context of the client computing device, wherein selecting the pre-action to execute comprises selecting the pre-action to execute based on the determined likelihood of success of the one or more pre-actions and the determined context of the client computing device.

Example 17 includes the subject matter of any of Examples 12-16, and wherein determining the likelihood of success comprises determining a likelihood that the user of the client computing device requests an action associated with the corresponding pre-action to be executed.

Example 18 includes the subject matter of any of Examples 12-17, and wherein determining the likelihood of success of the one or more pre-actions comprises determining the likelihood of success of the one or more pre-actions according to $$P(SUC | w_1, w_2, \ldots, w_M) = \frac{P(w_1, w_2, \ldots, w_M | SUC) \cdot P(SUC)}{P(w_1, w_2, \ldots, w_M)},$$

wherein SUC is a success of the corresponding pre-action and $w_1, w_2, \ldots, w_M$ are a number, M, of keywords from the historical behavior database in close proximity to one another.

Example 19 includes the subject matter of any of Examples 12-18, and wherein determining the likelihood of success of the one or more pre-actions comprises determining the likelihood of success of the one or more pre-actions based on the historical behavior data and a user profile of the user.

Example 20 includes the subject matter of any of Examples 12-19, and wherein selecting the pre-action to execute comprises determining a resource to prefetch.

Example 21 includes the subject matter of any of Examples 12-20, and further including executing, by the client computing device, the suggested pre-action identified by the selected pre-action.

Example 22 includes the subject matter of any of Examples 12-21, and further including receiving, by the client computing device, a resource request from the user in response to executing the determined pre-action; and updating, by the client computing device, the historical behavior database based on a success or failure of the executed pre-action, wherein the pre-action is determined to be successful if the received resource request corresponds with the executed pre-action.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to execution by a computing device, cause the computing device to perform the method of any of Examples 12-22.

Example 25 includes a computing device for pre-action execution, the computing device comprising means for requesting a resource from a server; means for receiving content from the server including the requested resource and one or more pre-action hints, wherein each of the one or more pre-action hints identifies a suggested pre-action to be taken by the computing device prior to receipt of a corresponding user request to perform the corresponding suggested pre-action; means for determining a likelihood of success of one or more pre-actions based on historical behavior data of a user of the computing device, wherein each pre-action corresponds to at least one of the one or more pre-action hints; and means for selecting a pre-action to execute based on the determined likelihood of success of the one or more pre-actions.

Example 26 includes the subject matter of Example 25, and wherein the means for requesting the resource comprises means for requesting a web page from the server.

Example 27 includes the subject matter of any of Examples 25 and 26, and further including means for determining whether the one or more pre-action hints are interpretable by the computing device.

Example 28 includes the subject matter of any of Examples 25-27, and further including means for extracting the one or more pre-action hints from the received content in response to determining the one or more pre-action hints are interpretable by the computing device.

Example 29 includes the subject matter of any of Examples 25-28, and further including means for determining a context of the computing device, wherein the means for selecting the pre-action to execute comprises means for selecting the pre-action to execute based on the determined likelihood of success of the one or more pre-actions and the determined context of the computing device.

Example 30 includes the subject matter of any of Examples 25-29, and wherein the means for determining the likelihood of success comprises means for determining a likelihood that the user of the computing device requests an action associated with the corresponding pre-action to be executed.

Example 31 includes the subject matter of any of Examples 25-30, and wherein the means for determining the likelihood of success of the one or more pre-actions comprises means for determining the likelihood of success of the one or more pre-actions according to $$P(SUC | w_1, w_2, \ldots, w_M) = \frac{P(w_1, w_2, \ldots, w_M | SUC) \cdot P(SUC)}{P(w_1, w_2, \ldots, w_M)},$$

wherein SUC is a success of the corresponding pre-action and $w_1, w_2, \ldots, w_M$ are a number, M, of keywords from the historical behavior database in close proximity to one another.

Example 32 includes the subject matter of any of Examples 25-31, and wherein the means for determining the likelihood of success of the one or more pre-actions comprises means for determining the likelihood of success of the one or more pre-actions based on the historical behavior data and a user profile of the user.

Example 33 includes the subject matter of any of Examples 25-32, and wherein the means for selecting the pre-action to execute comprises means for determining a resource to prefetch.

Example 34 includes the subject matter of any of Examples 25-33, and further including means for executing the suggested pre-action identified by the selected pre-action.

Example 35 includes the subject matter of any of Examples 25-34, and further including means for receiving a resource request from the user in response to executing the determined pre-action; and means for updating the historical behavior database based on a success or failure of the executed pre-action, wherein the pre-action is determined to be successful if the received resource request corresponds with the executed pre-action.

Example 36 includes a server for pre-action hint generation, the server comprising a communication module to receive a request for a resource from a client computing device; a content generation module to generate content including the requested resource; an extraction module to extract one or more sub-resources from the generated content; and a pre-action hint module to determine, based on the one or more extracted sub-resources, one or more pre-action hints to provide to the client computing device, wherein each of the one or more pre-action hints identifies a suggested pre-action to be taken by the client computing device prior to receipt of a corresponding user request to perform the corresponding suggested pre-action; wherein the content generation module is further to update the generated content to include the determined one or more pre-action hints.

Example 37 includes the subject matter of Example 36, and wherein to receive the request for the resource comprises to receive a request for a web page from the client computing device.

Example 38 includes the subject matter of any of Examples 36 and 37, and wherein to generate the content comprises to generate the web page for transmittal to the client computing device.

Example 39 includes the subject matter of any of Examples 36-38, and further including a database management module to determine whether the request for the resource was initiated by a user of the client computing device; and update a navigation behavior database based on the requested resource in response to a determination that the request for the resource was initiated by the user.

Example 40 includes the subject matter of any of Examples 36-39, and wherein to update the navigation behavior database comprises to associate the requested resource with a session identifier of a current session between the server and the client computing device.

Example 41 includes the subject matter of any of Examples 36-40, and wherein to update the navigation behavior database comprises to update the navigation behavior database based on a web page requested by the client computing device.

Example 42 includes the subject matter of any of Examples 36-41, and wherein to extract the one or more sub-resources from the generated content comprises to extract one or more hyperlinks from the generated content.

Example 43 includes the subject matter of any of Examples 36-42, and wherein to determine the one or more pre-action hints comprises to determine the one or more pre-action hints based on a collaborative filtering algorithm.

Example 44 includes the subject matter of any of Examples 36-43, and wherein to determine the one or more pre-action hints comprises to determine a previous session between a computing device and the server similar to a current session between the server and the client computing device.

Example 45 includes the subject matter of any of Examples 36-44, and wherein the communication module is further to transmit the updated content to the client computing device.

Example 46 includes a method of pre-action hint generation by a server, the method comprising receiving, by the server, a request for a resource from a client computing device; generating, by the server, content including the requested resource; extracting, by the server, one or more sub-resources from the generated content; determining, by the server and based on the one or more extracted sub-resources, one or more pre-action hints to provide to the client computing device, wherein each of the one or more pre-action hints identifies a suggested pre-action to be taken by the client computing device prior to receiving a corresponding user request to perform the corresponding suggested pre-action; and updating, by the server, the generated content to include the determined one or more pre-action hints.

Example 47 includes the subject matter of Example 46, and wherein receiving the request for the resource comprises receiving a request for a web page from the client computing device.

Example 48 includes the subject matter of any of Examples 46 and 47, and wherein generating the content comprises generating the web page for transmittal to the client computing device.

Example 49 includes the subject matter of any of Examples 46-48, and further including determining, by the server, whether the request for the resource was initiated by a user of the client computing device; and updating, by the server, a navigation behavior database based on the requested resource in response to determining the request for the resource was initiated by the user.

Example 50 includes the subject matter of any of Examples 46-49, and wherein updating the navigation behavior database comprises associating the requested resource with a session identifier of a current session between the server and the client computing device.

Example 51 includes the subject matter of any of Examples 46-50, and wherein updating the navigation behavior database comprises updating the navigation behavior database based on a web page requested by the client computing device.

Example 52 includes the subject matter of any of Examples 46-51, and wherein extracting the one or more sub-resources from the generated content comprises extracting one or more hyperlinks from the generated content.

Example 53 includes the subject matter of any of Examples 46-52, and wherein determining the one or more pre-action hints comprises determining the one or more pre-action hints based on a collaborative filtering algorithm.

Example 54 includes the subject matter of any of Examples 46-53, and wherein determining the one or more pre-action hints comprises determining a previous session between a computing device and the server similar to a current session between the server and the client computing device.

Example 55 includes the subject matter of any of Examples 46-54, and further including transmitting, by the server, the updated content to the client computing device.

Example 56 includes a computing device comprising a processor; and a memory having stored therein a plurality of instructions that when executed by the processor cause the computing device to perform the method of any of Examples 46-55.

Example 57 includes one or more machine-readable storage media comprising a plurality of instructions stored thereon that, in response to execution by a computing device, cause the computing device to perform the method of any of Examples 46-55.

Example 58 includes a server for pre-action hint generation, the server comprising means for receiving a request for a resource from a client computing device; means for generating content including the requested resource; means for extracting one or more sub-resources from the generated content; means for determining, based on the one or more extracted sub-resources, one or more pre-action hints to provide to the client computing device, wherein each of the one or more pre-action hints identifies a suggested pre-action to be taken by the client computing device prior to receiving a corresponding user request to perform the corresponding suggested pre-action; and means for updating the generated content to include the determined one or more pre-action hints.

Example 59 includes the subject matter of Example 58, and wherein the means for receiving the request for the resource comprises means for receiving a request for a web page from the client computing device.

Example 60 includes the subject matter of any of Examples 58 and 59, and wherein the means for generating the content comprises means for generating the web page for transmittal to the client computing device.

Example 61 includes the subject matter of any of Examples 58-60, and, further including means for determining whether the request for the resource was initiated by a user of the client computing device; and means for updating a navigation behavior database based on the requested resource in response to determining the request for the resource was initiated by the user.

Example 62 includes the subject matter of any of Examples 58-61, and wherein the means for updating the navigation behavior database comprises means for associating the requested resource with a session identifier of a current session between the server and the client computing device.

Example 63 includes the subject matter of any of Examples 58-62, and wherein the means for updating the navigation behavior database comprises means for updating the navigation behavior database based on a web page requested by the client computing device.

Example 64 includes the subject matter of any of Examples 58-63, and wherein the means for extracting the one or more sub-resources from the generated content comprises means for extracting one or more hyperlinks from the generated content.

Example 65 includes the subject matter of any of Examples 58-64, and wherein the means for determining the one or more pre-action hints comprises means for determining the one or more pre-action hints based on a collaborative filtering algorithm.

Example 66 includes the subject matter of any of Examples 58-65, and wherein the means for determining the one or more pre-action hints comprises means for determining a previous session between a computing device and the server similar to a current session between the server and the client computing device.

Example 67 includes the subject matter of any of Examples 58-66, and further including means for transmitting the updated content to the client computing device.

The invention claimed is:

1. A client computing device for pre-action execution, the client computing device comprising:
a communication module to (i) request a resource from a server and (ii) receive content from the server including the requested resource and one or more pre-action hints, wherein each of the one or more pre-action hints identifies a suggested pre-action to be taken by the client computing device prior to receipt of a corresponding user request to perform the corresponding suggested pre-action, wherein the suggested pre-action is based on an analysis of an identified previous session comprising an indication of the resources requested during the previous session, wherein the previous session is identified based on a similarity to a current session of the client computing device, wherein a user associated with the identified previous session is different from a current user of the client computing device; and
a pre-action management module to (i) determine a likelihood of success of one or more pre-actions based on historical behavior data of a user of the client computing device, wherein each pre-action corresponds to at least one of the one or more pre-action hints, and (ii) select a pre-action to execute based on the determined likelihood of success of the one or more pre-actions.

2. The client computing device of claim 1, wherein to request the resource comprises to request a web page from the server.

3. The client computing device of claim 1, wherein the pre-action management module is further to determine a context of the client computing device; and
wherein to select the pre-action to execute comprises to select the pre-action to execute based on the determined likelihood of success of the one or more pre-actions and the determined context of the client computing device.

4. The client computing device of claim 1, wherein to determine the likelihood of success comprises to determine a likelihood that the user of the client computing device requests an action associated with the corresponding pre-action to be executed.

5. The client computing device of claim 1, wherein to determine the likelihood of success of the one or more pre-actions comprises to determine the likelihood of success of the one or more pre-actions according to:

$$P(SUC|w_1, w_2, \ldots, w_M) = \frac{P(w_1, w_2, \ldots, w_M | SUC) \cdot P(SUC)}{P(w_1, w_2, \ldots, w_M)},$$

wherein SUC is a success of the corresponding pre-action and $w_1, w_2, \ldots, w_M$ are a number, M, of keywords from a historical behavior database in close proximity to one another.

6. The client computing device of claim 1, wherein to determine the likelihood of success of the one or more pre-actions comprises to determine the likelihood of success of the one or more pre-actions based on the historical behavior data and a user profile of the user.

7. The client computing device of claim 1, further comprising a plurality of user profiles stored thereon, wherein each of the plurality of user profiles identifies an aspect or characteristic of a specific user,
wherein to determine the likelihood of success of the one or more pre-actions comprises to:
identify a user profile of the plurality of user profiles corresponding to the user of the client computing device, wherein the user profile identifies an aspect or characteristic of the user of the client computing device;
determine the likelihood of success of the one or more pre-actions based on the historical behavior data and the aspect or characteristic of the user of the client computing device.

8. The client computing device of claim 1, wherein the pre-action management module is further to execute the suggested pre-action identified by the selected pre-action; and further comprising:
a user input module to receive a resource request from the user in response to execution of the determined pre-action; and
a database management module to update a historical behavior database stored on the client computing device based on a success or failure of the executed pre-action, wherein the pre-action is determined to be successful if the received resource request corresponds with the executed pre-action.

9. One or more non-transitory machine-readable storage media comprising a plurality of instructions stored thereon that, in response to execution by a client computing device, cause the client computing device to:
request a resource from a server;
determine a current user of the client computing device;
receive content from the server including the requested resource and one or more pre-action hints, wherein each of the one or more pre-action hints identifies a suggested pre-action to be taken by the client computing device prior to receipt of a corresponding user request to perform the corresponding suggested pre-action, wherein the suggested pre-action is based on an analysis of an identified previous session comprising an indication of the resources requested during the previous session, wherein the previous session is identified based on a similarity to a current session of the client computing device, wherein a user associated with the identified previous session is different from the current user of the client computing device;
identify historical behavior data of the current user based on the determination of the current user of the client computing device;
determine a likelihood of success of one or more pre-actions based on the historical behavior data of the current user of the client computing device, wherein each pre-action corresponds to at least one of the one or more pre-action hints; and
select a pre-action to execute based on the determined likelihood of success of the one or more pre-actions.

10. The one or more non-transitory machine-readable storage media of claim 9, wherein to determine the likelihood of success comprises to determine a likelihood that the current user of the client computing device requests an action associated with the corresponding pre-action to be executed.

11. The one or more non-transitory machine-readable storage media of claim 9, wherein to determine the likelihood of success of the one or more pre-actions comprises to determine the likelihood of success of the one or more pre-actions according to $$P(SUC \mid w_1, w_2, \ldots, w_M) = \frac{P(w_1, w_2, \ldots, w_M \mid SUC) \cdot P(SUC)}{P(w_1, w_2, \ldots, w_M)},$$

wherein SUC is a success of the corresponding pre-action and $w_1, w_2, \ldots, w_M$ are a number, M, of keywords from a historical behavior database in close proximity to one another.

12. The one or more non-transitory machine-readable storage media of claim 9, wherein to determine the likelihood of success of the one or more pre-actions comprises to determine the likelihood of success of the one or more pre-actions based on the historical behavior data and a user profile of the current user.

13. The one or more non-transitory machine-readable storage media of claim 9, wherein the plurality of instructions further cause the client computing device to:
execute the suggested pre-action identified by the selected pre-action;
receive a resource request from the current user in response to execution of the determined pre-action; and
update a historical behavior database of the client computing device based on a success or failure of the executed pre-action, wherein the pre-action is determined to be successful if the received resource request corresponds with the executed pre-action.

14. The one or more non-transitory machine-readable storage media of claim 9, wherein the plurality of instructions further cause the client computing device to:
determine whether the one or more pre-action hints are interpretable by the client computing device; and
extract the one or more pre-action hints from the received content in response to a determination that the one or more pre-action hints are interpretable by the client computing device.

15. A server for pre-action hint generation, the server comprising:
a navigation behavior database comprising data of a plurality of previous sessions, wherein each previous session of the plurality of previous sessions comprises an indication of the resources requested during the corresponding previous session, wherein each of the plurality of previous sessions is associated with a different user;
a communication module to receive a request for a resource from a client computing device;
a content generation module to generate content including the requested resource;
an extraction module to extract one or more sub-resources from the generated content; and
a pre-action hint module to:
identify a previous session of the plurality of previous sessions that is similar to a current session between the server and the client computing device, wherein the user associated with the identified previous session is different from a current user of the client computing device;
determine, based on the one or more extracted sub-resources and the indication of the resources requested during the previous session similar to the current session, one or more pre-action hints to provide to the client computing device, wherein each of the one or more pre-action hints identifies a suggested pre-action to be taken by the client computing device prior to receipt of a corresponding user request to perform the corresponding suggested pre-action;

wherein the content generation module is further to update the generated content to include the determined one or more pre-action hints.

16. The server of claim 15, wherein to receive the request for the resource comprises to receive a request for a web page from the client computing device; and wherein to extract the one or more sub-resources from the generated content comprises to extract one or more hyperlinks from the generated content.

17. The server of claim 15, further comprising a database management module to:

determine whether the request for the resource was initiated by a user of the client computing device; and update a navigation behavior database based on the requested resource in response to a determination that the request for the resource was initiated by the user.

18. The server of claim 17, wherein to update the navigation behavior database comprises to associate the requested resource with a session identifier of the current session between the server and the client computing device.

19. The server of claim 15, wherein to determine the one or more pre-action hints comprises to determine the one or more pre-action hints based on a collaborative filtering algorithm.

20. One or more non-transitory machine-readable storage media comprising a plurality of instructions stored thereon that, in response to execution by a server, cause the server to:

receive a request for a resource from a client computing device;

generate content including the requested resource;

extract one or more sub-resources from the generated content;

identify a previous session of a plurality of previous sessions stored on the server that is similar to a current session between the server and the client computing device, wherein each previous session of the plurality of previous sessions comprises an indication of the resources requested during the corresponding previous session, wherein each of the plurality of previous sessions is associated with a different user, and wherein the user associated with the identified previous session is different from a current user of the client computing device;

determine, based on the one or more extracted sub-resources and the indication of the resources requested during the previous session similar to the current session, one or more pre-action hints to provide to the client computing device, wherein each of the one or more pre-action hints identifies a suggested pre-action to be taken by the client computing device prior to receiving a corresponding user request to perform the corresponding suggested pre-action; and update the generated content to include the determined one or more pre-action hints.

21. The one or more non-transitory machine-readable storage media of claim 20, wherein the plurality of instructions further cause the server to:

determine whether the request for the resource was initiated by a user of the client computing device; and update a navigation behavior database based on the requested resource in response to a determination that the request for the resource was initiated by the user.

22. The one or more non-transitory machine-readable storage media of claim 21, wherein to update the navigation behavior database comprises to associate the requested resource with a session identifier of the current session between the server and the client computing device and store an indication of the association of the requested resource with the session identifier in the navigation behavior database.

23. The one or more non-transitory machine-readable storage media of claim 20, wherein to determine the one or more pre-action hints comprises to determine the one or more pre-action hints based on a collaborative filtering algorithm.

24. The one or more non-transitory machine-readable storage media of claim 20, wherein the plurality of instructions further cause the server to transmit the updated content to the client computing device.

* * * * *